UNITED STATES PATENT OFFICE.

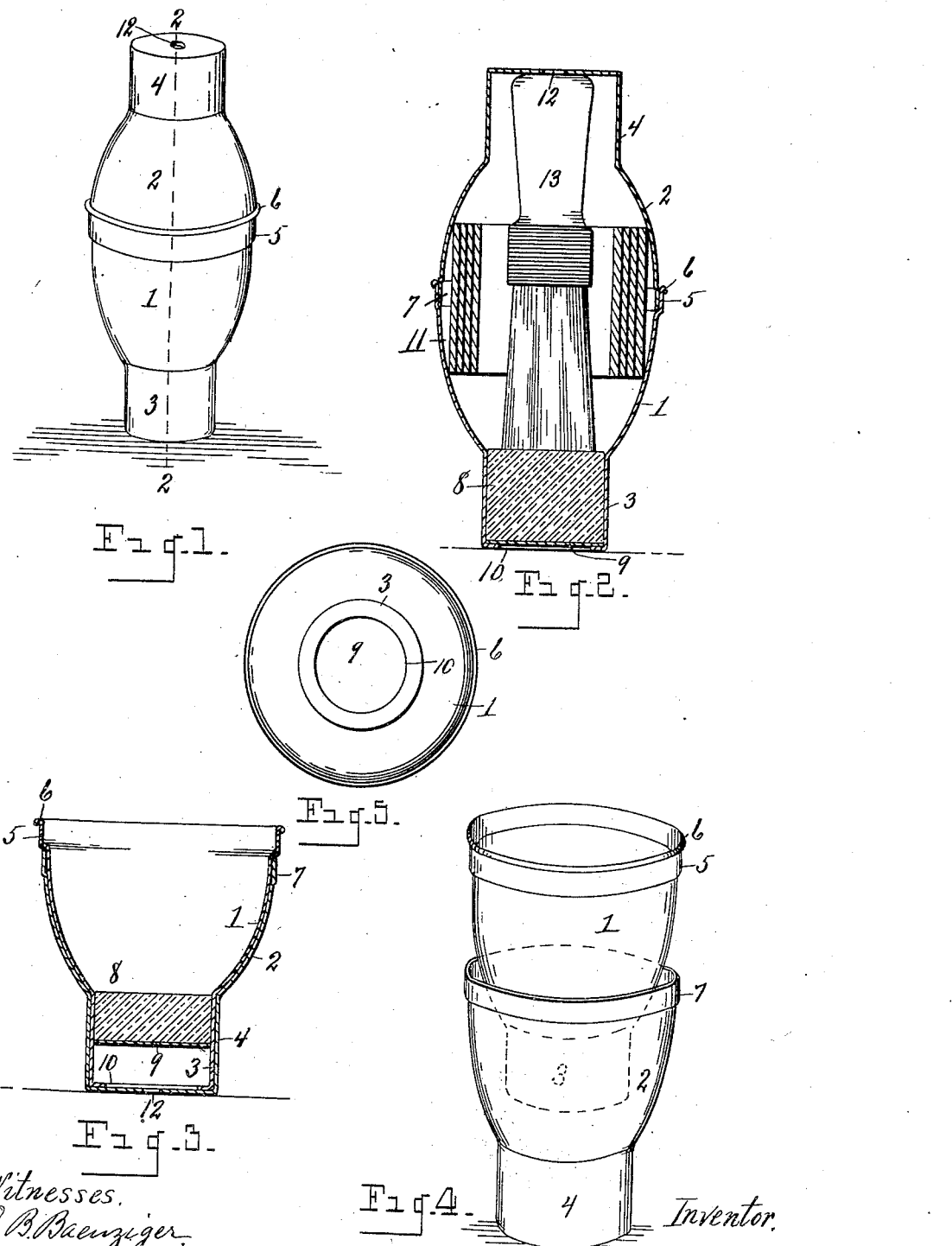

CHARLES W. TAYLOR, OF NEW YORK, N. Y.

SHAVING-CUP.

No. 839,970.        Specification of Letters Patent.        Patented Jan. 1, 1907.

Application filed September 5, 1905. Serial No. 276,940.

*To all whom it may concern:*

Be it known that I, CHARLES W. TAYLOR, a citizen of the United States, residing at New York, in the county of New York, State of New York, have invented certain new and useful Improvements in Shaving-Cups; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to shaving-cups; and it consists in the construction and arrangement of parts hereinafter fully set forth, and pointed out particularly in the claim.

The object of the invention is to produce a shaving-cup especially adapted for use in traveling in which the arrangement is such as to provide a receptacle for the soap, brush, and strop, said receptacle being formed of two parts adapted to fit one into the other when closed and adapted to nest one into the other when open for use, and the shape of the parts being such as to maintain the cup upright when in service, provision being made for projecting the soap upwardly from the bottom as it is consumed, and provision being made for ventilating the cup when closed. The above object is attained by the structure illustrated in the accompanying drawings, in which—

Figure 1 is a perspective view of a cup involving my invention. Fig. 2 is a vertical central section through the cup and soap and the razor-strop coiled therein, the brush within the cup appearing in elevation. Fig. 3 is a vertical central section through the cup with the parts thereof nested as when in use. Fig. 4 is a perspective view showing the manner in which the parts are fitted together for service. Fig. 5 is an inverted plan of the cup.

The body of the cup is elliptical in exterior outline and describes a globular body which tapers from the center toward the ends, consisting of the lower and upper telescopic shells 1 and 2, each having a hollow cylindrical end portion 3 and 4, respectively.

The cup is preferably formed of aluminium, but may be made of any suitable material. As illustrated, the lower shell is provided with a rim 5, which is offset from the body and provided with a rolled or otherwise suitably-finished margin 6. The upper shell 2 has a marginal portion 7, adapted to fit within the rim of the lower shell, as clearly shown in Fig. 2, to close the cup and retain the contents therein. The cylindrical base 3 of the lower shell forms a receptacle for the soap 8, which is fitted therein and which is supported upon a vertically-movable disk 9, forming the bottom upon which the soap rests, said disk closing the aperture 10 through the bottom of said receptacle and at the same time being accessible therethrough, whereby it may be pushed upwardly in the receptacle to present the soap to the brush as fast as consumed, as shown in Fig. 3.

The cylindrical top of the upper shell 2 serves as a housing for the handle 13 of the brush when the parts are assembled, as shown in Fig. 2, said cylindrical top, as well as the body of the upper shell, being of such diameter as to receive the body and cylindrical bottom portion of shell 1 to enable said shells to be nested, as shown in Fig. 3, in which position the cup is in readiness for use, the cylindrical top 4 of the upper shell forming the base on which the cup rests and being of greater diameter than the cylindrical part 3 affords a broader support for the cup, rendering it less liable to tip over. The presence of the soap in the base of the cup adds considerable weight thereto and assists materially in maintaining the cup upright when the parts are nested and the cup is in use.

The elliptical or oblong form of the body of the cup is essential in order to accommodate the brush, which, as will be seen in Fig. 2, is confined within the cup when the cup is closed. It will also be seen on referring to Fig. 2 that the strop 11 is housed within the cup by coiling it around the brush. In the top of the cylindrical end portion 4 is an opening 12, which affords ventilation and prevents the strop from molding.

When made of aluminium, this improved cup is exceedingly light and strong, affording a sanitary receptacle for the soap, brush, and strop and because of its peculiar shape and construction occupying but a comparatively small space when in use for shaving or when confining said articles therein, as shown in Fig. 2.

Having thus fully set forth my invention, what I claim as new, and desire to secure by Letters Patent, is—

A shaving-cup, comprising a globular body consisting of two shell-like parts having engageable margins which retain the cup closed, said parts forming when united the walls of the cup, and adapted to fit one into the other, one part having a reduced annular receptacle to receive the soap, and the other part having an annular housing for the handle of the brush, the reduced soap-receptacle fitting within the annular housing for the brush-handle when the parts are nested.

In testimony whereof I sign this specification in the presence of two witnesses.

CHARLES W. TAYLOR.

Witnesses:
 JOHN W. McDOWELL,
 B. B. BARR.